US012078522B2

(12) United States Patent
Barnard

(10) Patent No.: US 12,078,522 B2
(45) Date of Patent: Sep. 3, 2024

(54) SYSTEM AND METHOD FOR FUEL MONITORING AND SPILL PREVENTION

(71) Applicant: BNSF Railway Company, Fort Worth, TX (US)

(72) Inventor: John Edward Barnard, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/810,409

(22) Filed: Jul. 1, 2022

(65) Prior Publication Data
US 2023/0057254 A1 Feb. 23, 2023

Related U.S. Application Data

(62) Division of application No. 17/405,381, filed on Aug. 18, 2021, now Pat. No. 11,422,019.

(51) Int. Cl.
G01F 23/02 (2006.01)
B67D 7/04 (2010.01)
B67D 7/12 (2010.01)
B67D 7/32 (2010.01)

(52) U.S. Cl.
CPC ........... G01F 23/02 (2013.01); B67D 7/0401 (2013.01); B67D 7/12 (2013.01); B67D 7/3209 (2013.01); B67D 2007/0419 (2013.01); B67D 2007/0473 (2013.01); B67D 2007/0474 (2013.01)

(58) Field of Classification Search
CPC .... B67D 2007/0474; B67D 2007/0473; B67D 2007/0419; B67D 7/0486; B67D 7/0401; B67D 7/12; B67D 7/465; G01F 23/02
See application file for complete search history.

(56) References Cited

U.S. PATENT DOCUMENTS

| | | | |
|---|---|---|---|
| 2,859,310 A | 11/1958 | De Leonardis | |
| 3,389,603 A * | 6/1968 | Jacobs, III | G01F 23/74 |
| | | | 73/290 R |
| 3,662,924 A | 5/1972 | Crandall et al. | |
| 4,441,533 A | 4/1984 | Snyder et al. | |
| 4,503,994 A | 3/1985 | Pyle | |
| 5,103,648 A | 4/1992 | Barbier | |

(Continued)

FOREIGN PATENT DOCUMENTS

GB 2107463 A * 4/1983 ......... G01F 23/2922

Primary Examiner — Timothy P. Kelly
(74) Attorney, Agent, or Firm — Whitaker Chalk Swindle & Schwartz PLLC; Enrique Sanchez, Jr.; Juan Vasquez

(57) ABSTRACT

A system, methods, and apparatus for preventing receptacle overfilling are presented. The system can include a sensor member configured to couple with a receptacle and sense a material level within the receptacle, such as via a sight glass of the receptacle. The system can include a controller in operable communication with the sensor member and configured to instantiate the shutoff of material flow from a material dispensing system if a particular material level is detected by the sensor member. The system can include an intermediate member configured to relay communications between the sensor member and the controller. The intermediate member can be coupled to a fluid line and can further act as a holster for the sensor member, such as by facilitating the coupling of the sensor member to the intermediate member and/or the fluid line.

17 Claims, 12 Drawing Sheets

(56) References Cited

U.S. PATENT DOCUMENTS

| | | | |
|---|---|---|---|
| 5,131,441 A | 7/1992 | Simpson et al. | |
| 5,154,079 A * | 10/1992 | Lupoli | G01F 23/38 340/624 |
| 5,785,464 A * | 7/1998 | May, III | B29C 31/02 406/171 |
| 7,543,611 B2 | 6/2009 | Kallberg | |
| 2008/0173088 A1 | 7/2008 | Quill | |

* cited by examiner

SYSTEM AND METHOD FOR FUEL MONITORING AND SPILL PREVENTION

CROSS-REFERENCE TO RELATED APPLICATIONS

The present application is a Divisional application of U.S. patent application Ser. No. 17/405,381, filed Aug. 18, 2021, which is incorporated herein in its entirety for all purposes.

TECHNICAL FIELD

The present disclosure relates generally to fluid monitoring systems, and more specifically to apparatuses, systems, and methods for preventing the overfill of receptacles, such as fuel tanks.

BACKGROUND

Overfilling of receptacles can pose a significant problem for a myriad of industries. For example, for companies in the business of manufacturing and/or distributing toxic chemicals, overfilling a chemical container can lead to expensive and hazardous cleanup, fines, sanctions, and other potential consequences. Such spillage also causes significant waste of otherwise valuable material.

Overfilling is also a problem in vehicle industries. Trains, planes, and automobiles all rely on fuel, often liquid fuel, that must be conveyed from a fuel source to a receptacle, such as a fuel tank or transportation tankard, to be utilized. Vehicle fuel tanks (and the containers used to ship vehicle fuel) can be gargantuan—for example, a common diesel locomotive can have a fuel tank capacity of five thousand gallons. The need to fill such large volumes in a timely manner requires significantly increased flow rate as compared to, for example, a gas station pump used to fill personal vehicles. Because of this increased flow rate, the amount of spillage from overfilling can be greatly exacerbated simply because the amount of fuel that can be expelled in the same time frame as compared to, again, a regular gas station dispenser, is much larger. While some industrial fueling systems have automatic shutoff functionality (e.g., a fuel-sensitive nozzle), this functionality can be greatly hindered by common practices in the industry. For example, many industrial fuel dispensing systems do not have the lever-lock functionality found in gas station pumps, meaning that personnel will often jam the lever into the nozzle handle to maintain a flow while other work is performed. As such, the flow can continue well after the fuel tank is full.

SUMMARY

The present disclosure achieves technical advantages as a system and method for fuel monitoring and spill prevention. For example, a fluid dispensing system capable of automatically terminating fuel flow by monitoring a sight glass of a receptacle with a sensor is disclosed. In one embodiment, the system can include a controller configured to communicate with one or more valves integrated with the system between the fuel source location of dispensing, enabling the system to automatically close a valve if a particular fluid level in the receptacle is reached. In another embodiment, the present disclosure can provide a receptacle system that can be configured to prevent overfilling, such as by implementing a sensor proximate a sight glass of the receptacle to generate a signal if a material level is detected. It is an object of the present disclosure to provide a method to prevent overfilling by utilizing sight glasses of receptacles in a novel way, such as by providing an apparatus configured to automate sight glass monitoring and communicate with a dispensing system to terminate material dispensing.

In one embodiment, a fluid dispensing system can comprise: a fluid line operably coupled with a fluid source and configured to dispense fluid from the fluid source via a first end of the fluid line; at least one valve configured to regulate dispensing of fluid from the fluid source; a sensor member configured to couple to a receptacle and detect a fluid level within the receptacle; and a controller in operable communication with the sensor member, the controller configured to receive a signal generated via the sensor member and initiate operation of the valve in response to receiving the signal. Further including a nozzle operably coupled to the first end of the fluid line and configured to dispense fluid. Wherein the at least one valve is disposed between the fluid source and the first end of the fluid line. Wherein the valve is disposed within the nozzle. Wherein the sensor member is configured to detect the fluid level within the receptacle via a sight glass of the receptacle. Further including an intermediate member coupled to the fluid line. Wherein the intermediate member is in operable communication with at least one of the sensor member and the controller. Wherein the intermediate member is configured to facilitate coupling of the sensor member to the fluid line. Wherein the intermediate member is configured to receive the signal from the sensor member and transmit the signal or a derivative thereof to the controller. Wherein the sensor member includes a support configured to abut the sight glass.

In another embodiment, the present disclosure can include a sight glass monitor apparatus comprising: a support member including a front side and a back side, the support member configured to couple to a receptacle having a sight glass; a sensor having a front portion and coupled to the support member; and a controller in operable communication with the sensor and configured to receive one or more signals from the sensor, wherein the sensor is configured to detect a level of a material in the receptacle via the sight glass. Wherein the support member includes a handle. Wherein the support member includes a base portion having an opening. Wherein the front portion of the sensor is positioned to face toward the back side of the support member through the opening. Wherein the support member is configured to magnetically couple to the receptacle. Wherein the support member further includes a hinged brace configured to abut the receptacle.

In another embodiment, the present disclosure can include a method of monitoring a level of material in a receptacle, and the method can comprise the steps of: orienting a sensor relative to a sight glass, wherein the sensor is configured to detect a material within the receptacle via the sight glass; depositing a material within the receptacle; generating at least one signal via the sensor in response to detection of the material; and transmitting the at least one signal. Further including the step of terminating the depositing of material into the receptacle in response to the signal. Wherein the signal is an alert. Further including the step of receiving the at least one signal via a controller. Further including the step of initiating, via the controller, termination of the depositing of the material in response to the signal. Wherein the controller is configured to initiate operation of a valve to prevent depositing of the material into the receptacle. Wherein the material is fuel.

In another embodiment, the present disclosure can include a receptacle system for preventing overfilling, and the system can comprise: a receptacle having an interior, an exterior, and a sight glass configured to provide a view of the interior of the receptacle from the exterior of the receptacle; a sensor disposed proximate the exterior of the receptacle and configured to detect a material on the interior of the receptacle via the sight glass; and a controller in operable communication with the sensor and configured to receive at least one signal from the sensor. Wherein the controller, in response to the at least one signal, is configured to generate an alert. Wherein the controller, in response to the at least one signal, is further configured to initiate shutoff of fluid dispensing to the receptacle. Wherein the sensor is operably coupled to a support member configured to support the sensor proximate the exterior of the receptacle. Further comprising an intermediate member in operable communication with the sensor and the controller. Wherein the intermediate member is coupled to a fuel line. Wherein the intermediate member is configured to receive the sensor.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1A:
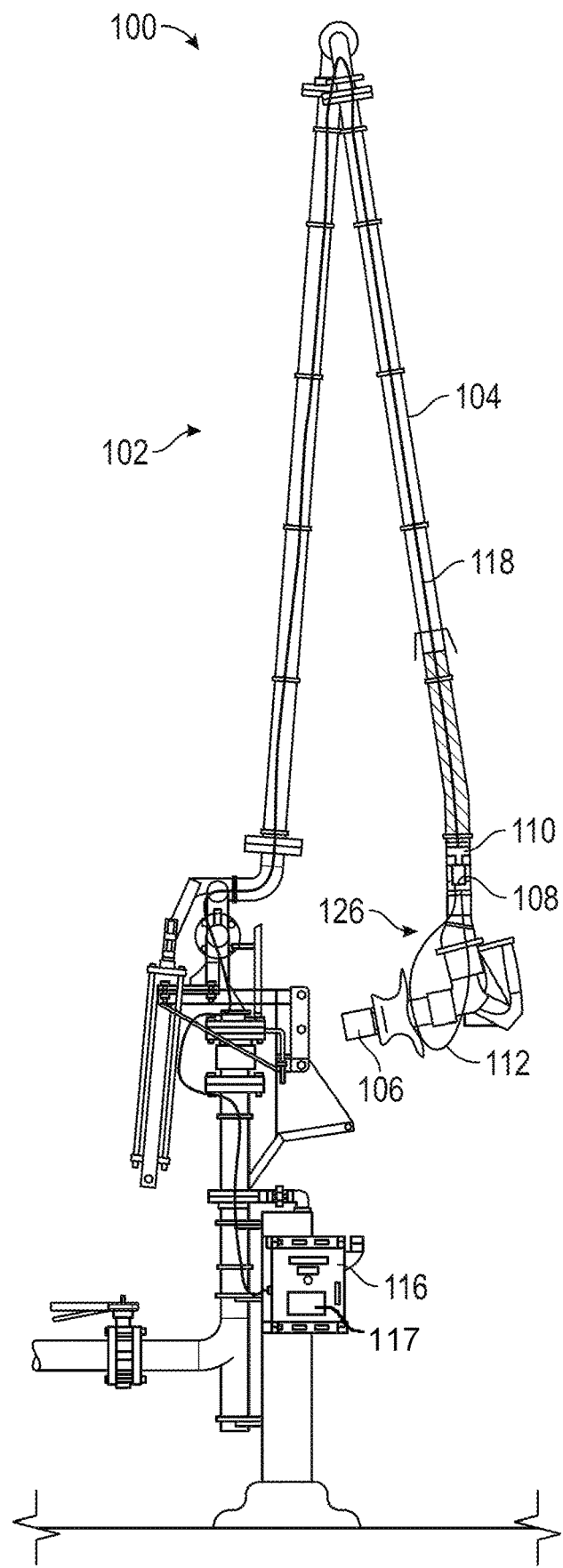
FIGS. 1A-1C illustrate perspective views of a fluid dispensing system in accordance with one or more exemplary embodiments of the present disclosure.
Figure 1B:
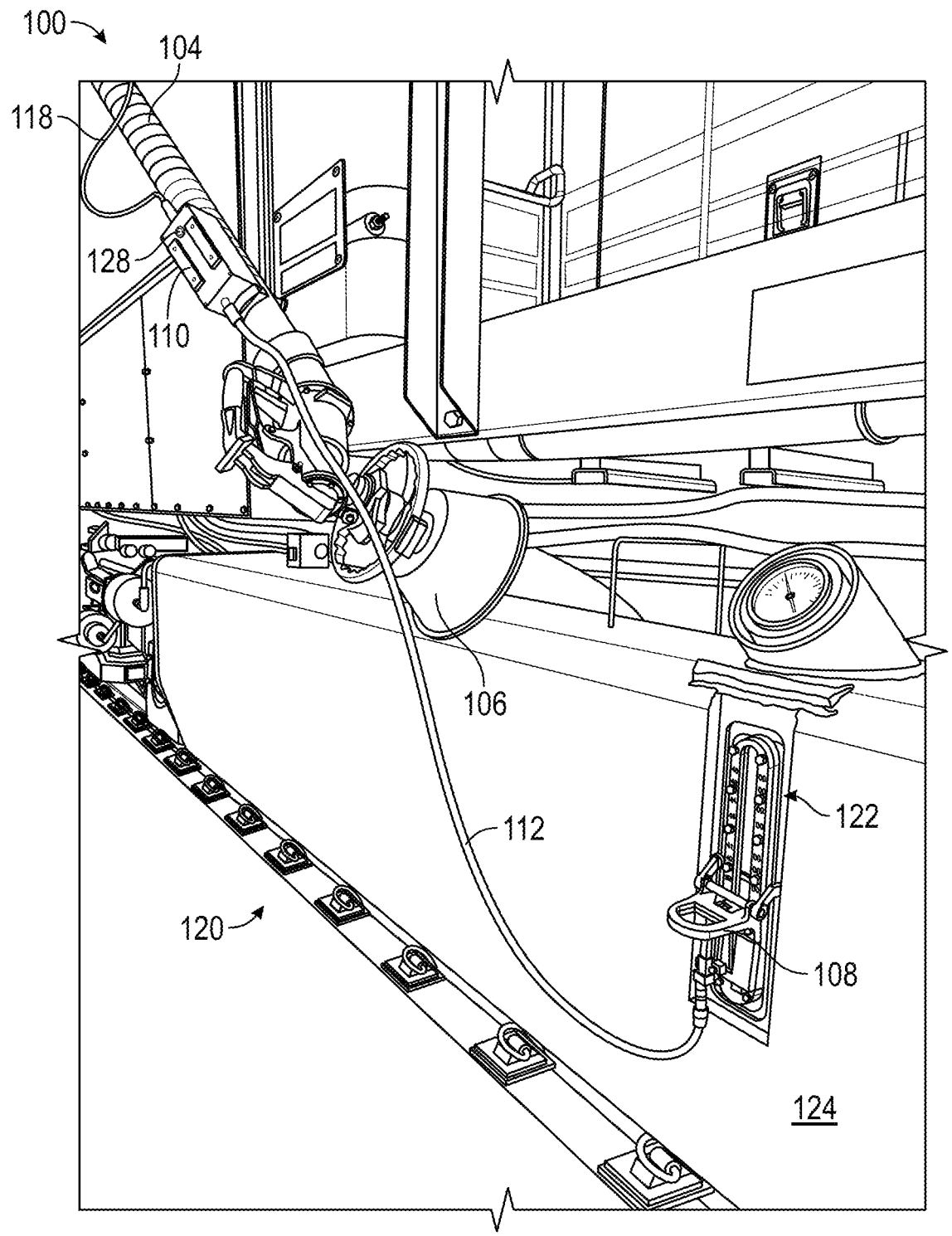
Figure 1C:
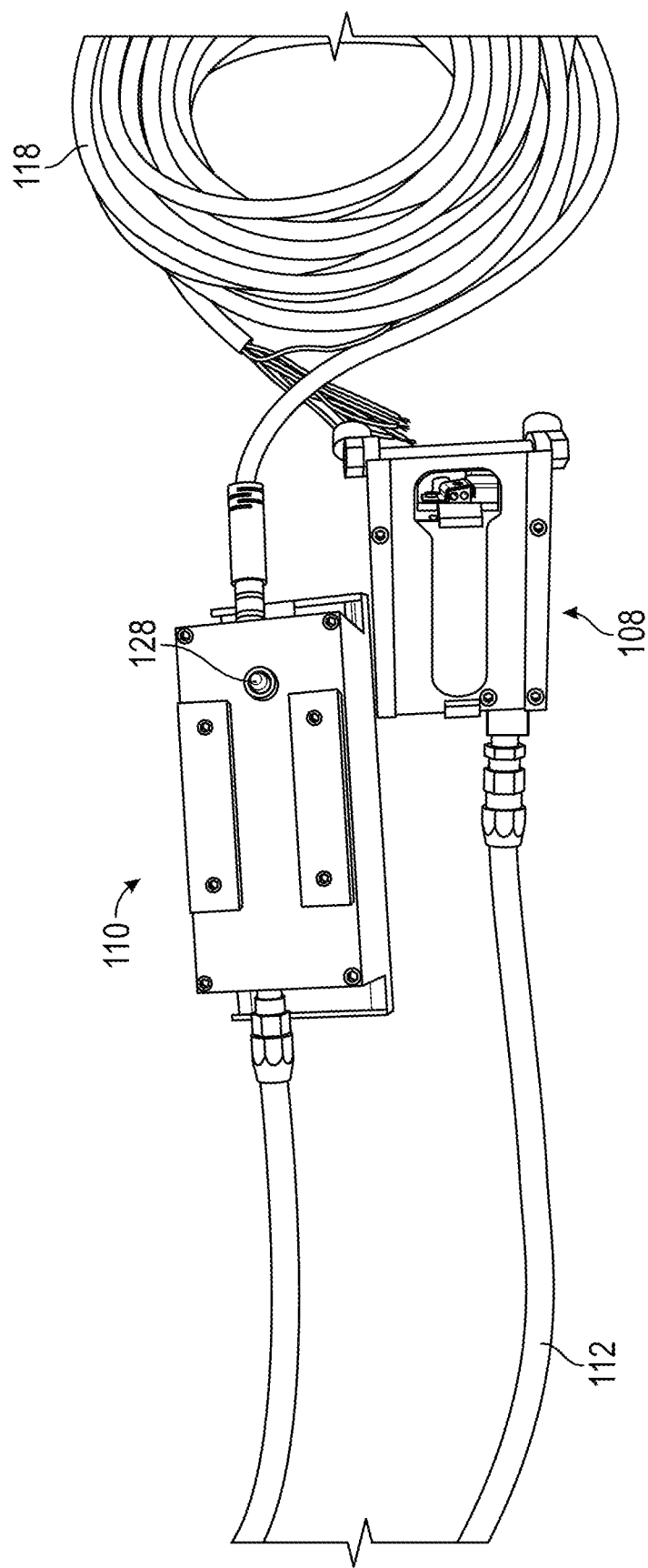
Figure 2A:
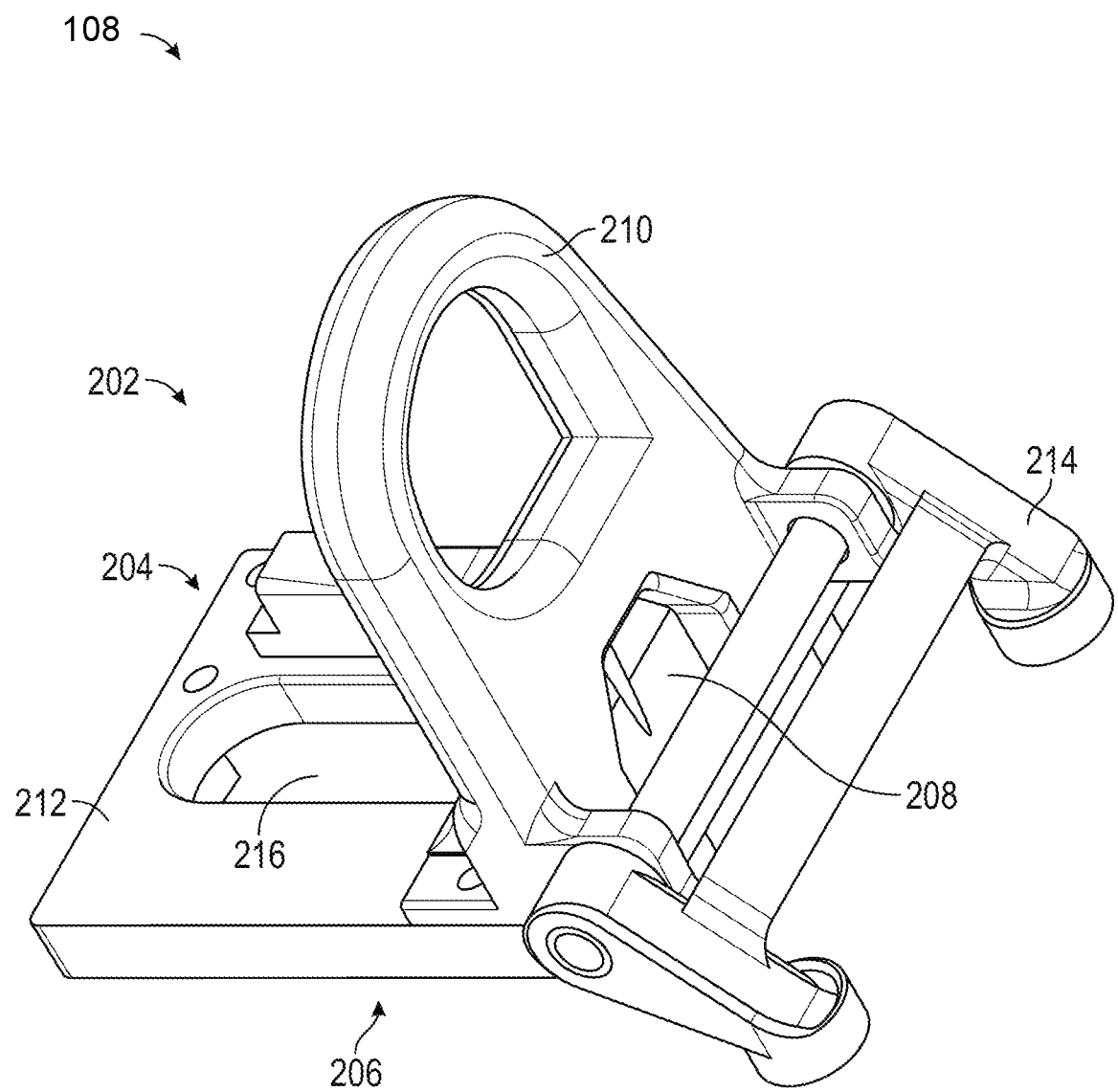
FIGS. 2A-2L illustrate perspective and schematic views of a sight glass monitor apparatus in accordance with one or more exemplary embodiments of the present disclosure.
Figure 2B:
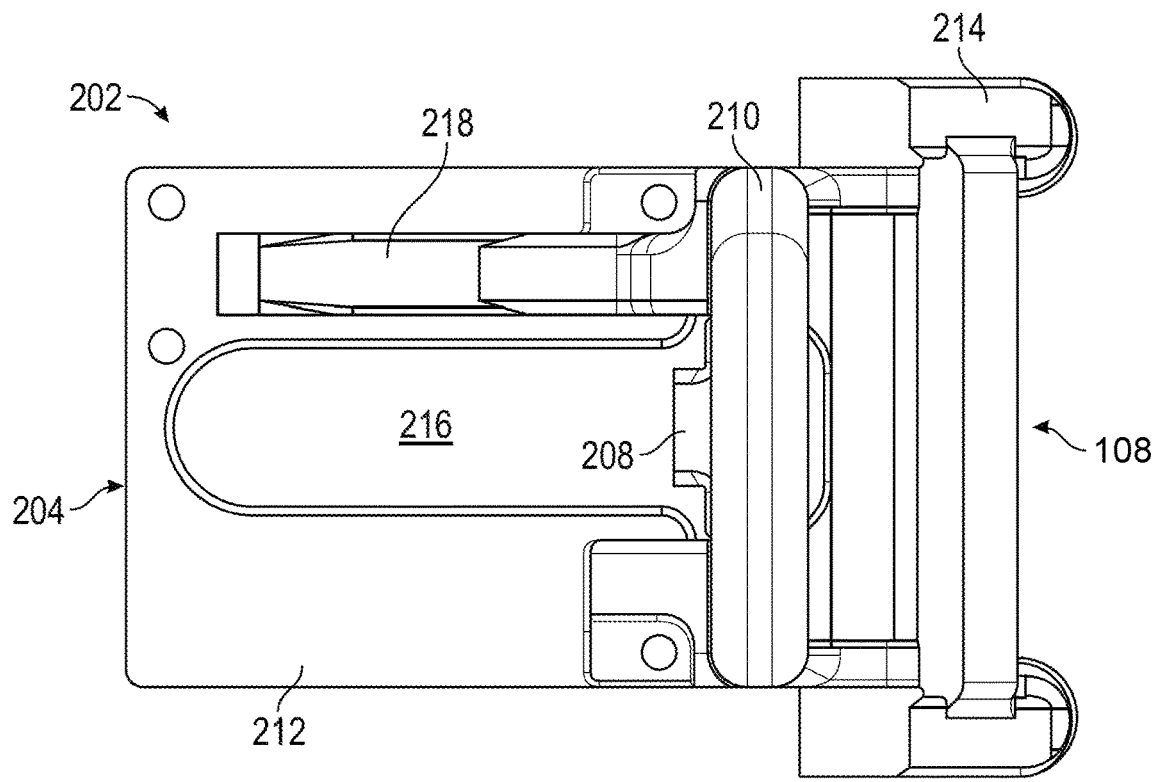
Figure 2C:
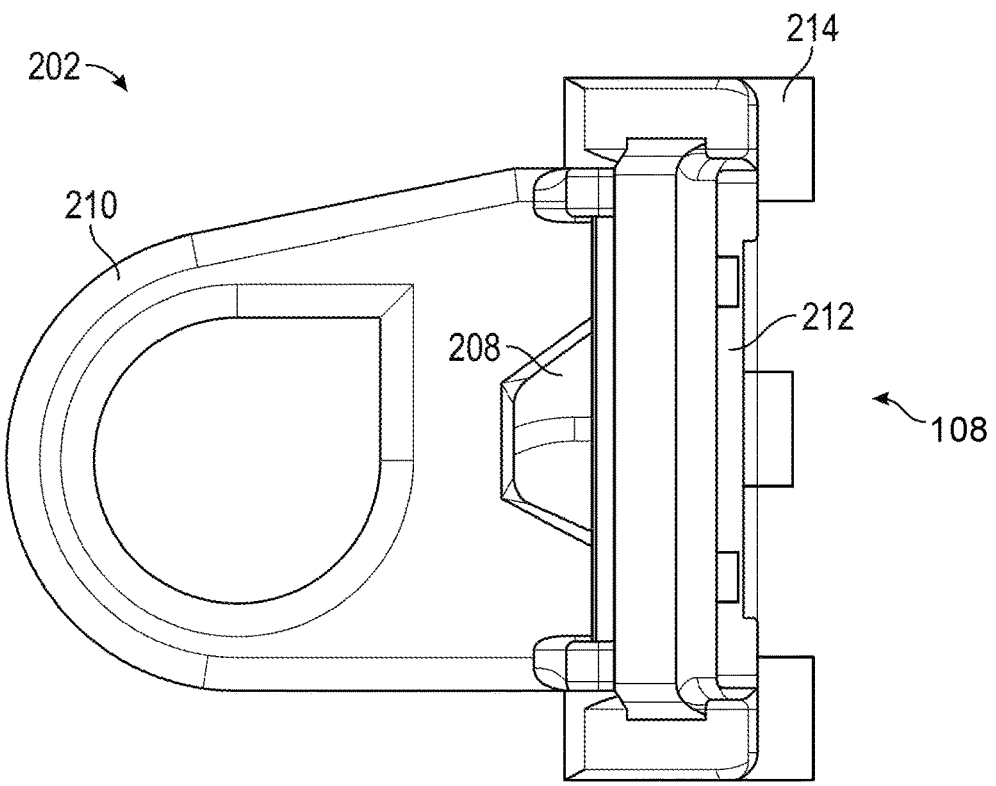
Figure 2D:
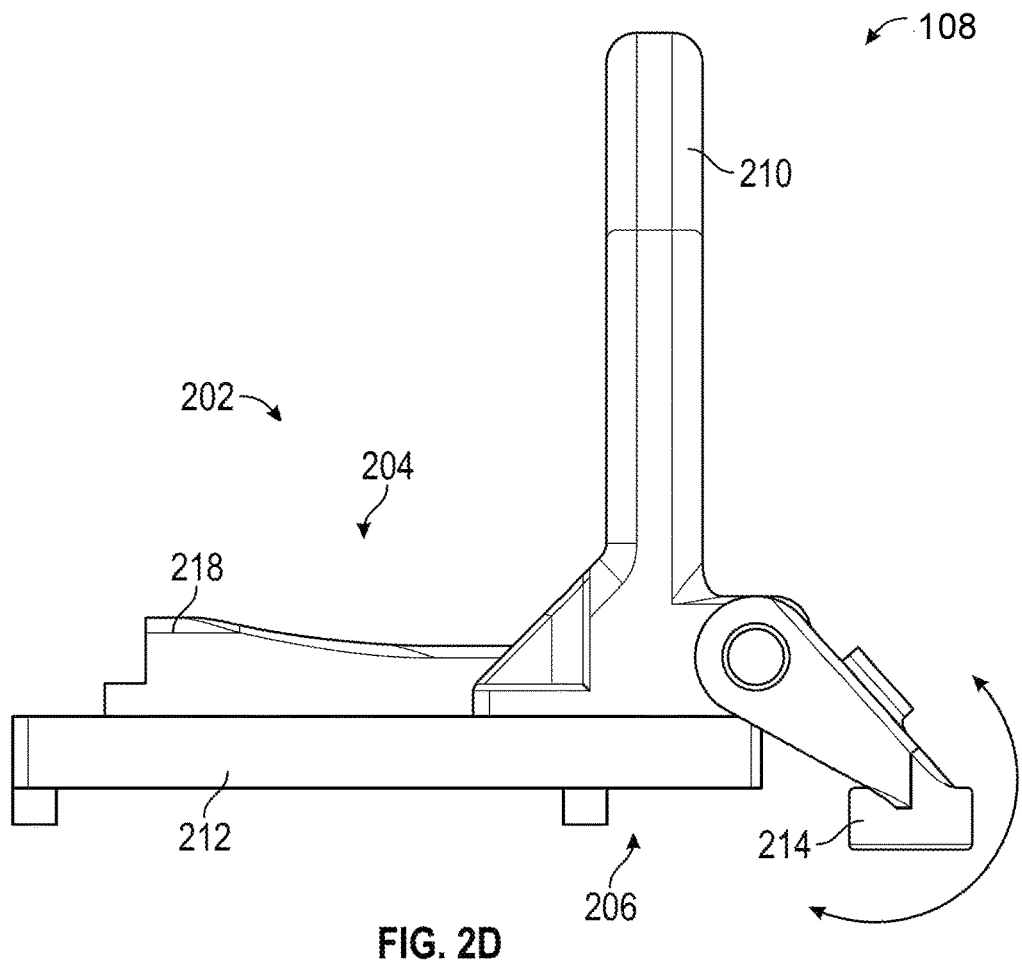
Figure 2E:
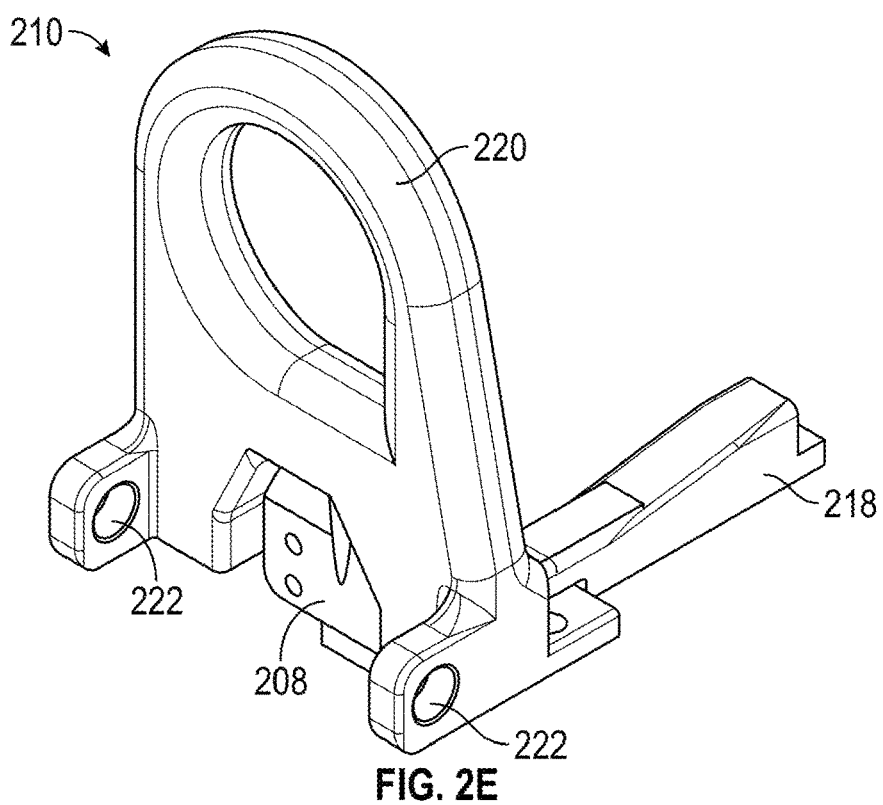
Figure 2F:
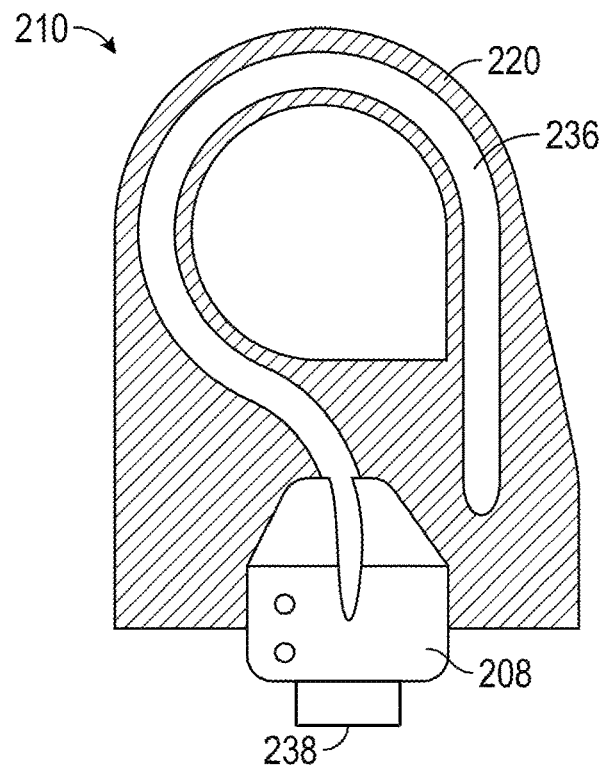
Figure 2G:
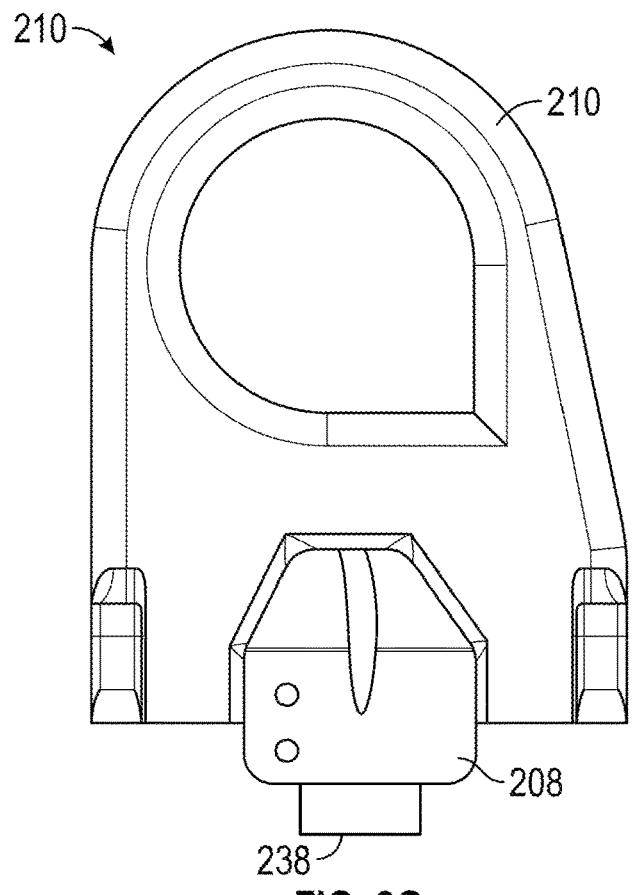
Figure 2H:
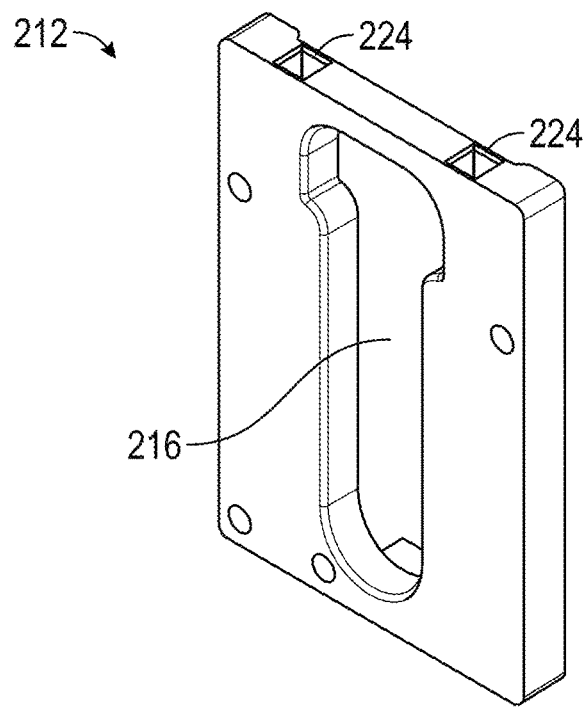
Figure 2I:
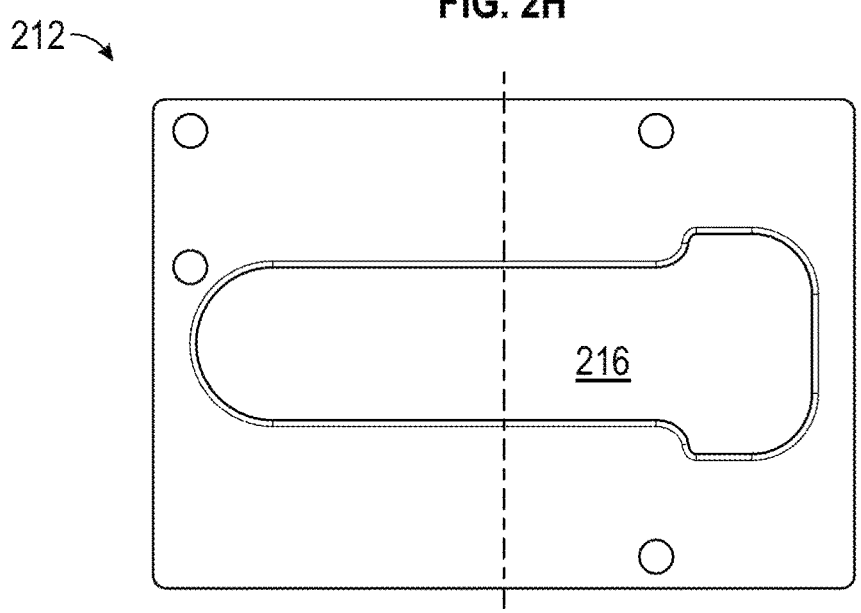
Figure 2J:
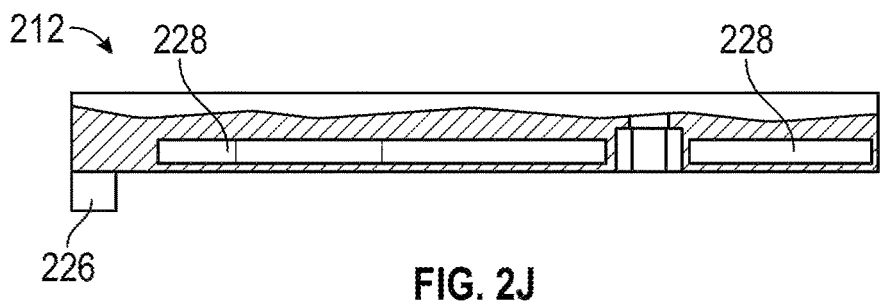
Figure 2K:
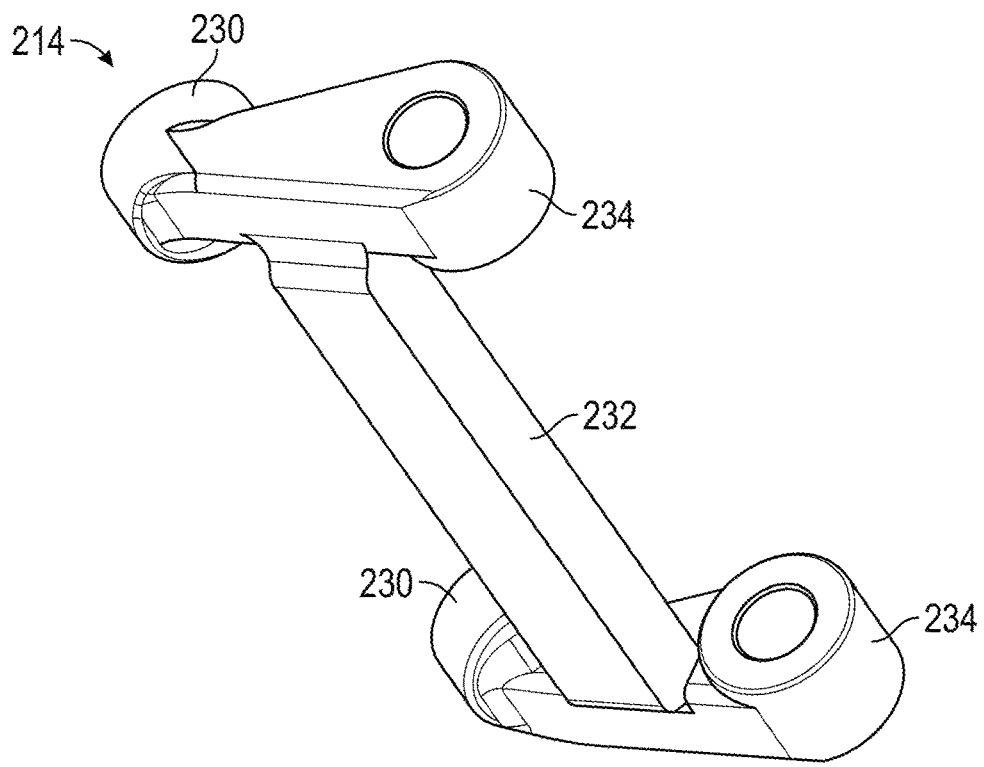
Figure 2L:
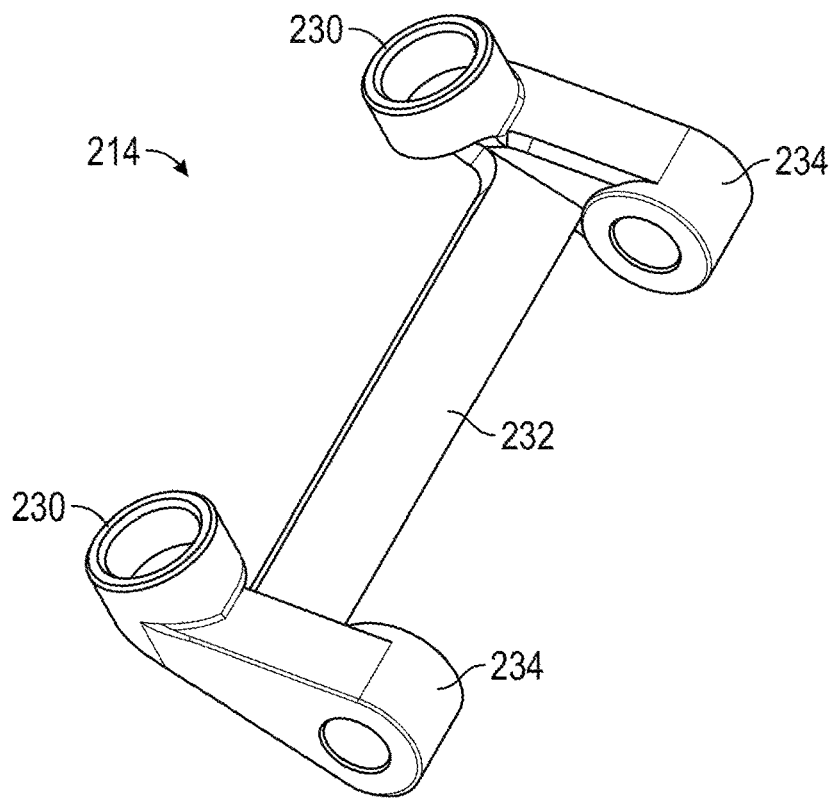

FIG. 1A-1C illustrate perspective views of a fluid dispensing system 100 in accordance with one or more embodiments of the present disclosure. In one embodiment, the fluid dispensing system 100 can include a fluid dispensing crane 102. For example, the fluid dispensing crane 102 can be and/or be similar to a fueling crane known in the art. In another embodiment, the system 100 can include a fluid line 104. In one embodiment, the fluid line 104 can be a hose, tube, line, or any conduit suitable to transport a fluid from one location to another location. In another embodiment, fluid line 104 can be rubber, polymer, or any other suitable material. In another embodiment, the fluid line 104 can include a first end 126 that fluid can flow out of. In another embodiment, the first end 126 can be coupled with a nozzle 106. For example, nozzle 106 can include a nozzle and a fluid flow control handle and/or lever, such as fueling nozzles known in the art. In another embodiment, the nozzle 106 can be any nozzle suitable to facilitate the dispensing of fluid from the fluid line 104.

In another embodiment, the fluid dispensing system 100 can be configured with an automatic shut off functionality. In one embodiment, the fluid dispensing system 100 can include a sensor member 108. In one embodiment, the sensor member 108 can be configured to detect a fluid level within a receptacle (e.g., receptacle 124). For example, the sensor member 108 can be configured to couple with a receptacle 124 and sense a fluid level within. For example, the sensor member 108 can be configured to utilize vibrations to determine a fluid level within a receptacle. In another embodiment, the sensor member 108 can be configured to utilize light, acoustics, or any other suitable sensing mechanism to determine a fluid level. For example, the sensor member 108 can be configured to utilize infrared light to detect fluid through a sight glass 122. In one exemplary embodiment, the sensor member 108 can be configured to couple with the receptacle 124 and detect a fluid level within the receptacle 124 via a sight glass (e.g., sight glass 122) of the receptacle. In one embodiment, a sight glass 122 can include a lens through which the interior of a receptacle 124 can be seen from the exterior of the receptacle 124. In another embodiment, a sight glass 122 can be any structure on a receptacle 124 that can enable a view of a fluid level within the receptacle 124. In one embodiment, the sensor member 108 can be configured to couple proximate a sight glass 122 and utilize optical sensing mechanisms to detect a fluid level through the sight glass 122.

In another embodiment, the fluid dispensing system 100 can include an intermediate member 110. In one embodiment, the intermediate member can be coupled with the fluid line 104. In another embodiment, the intermediate member 110 can be coupled with the fuel crane 102. In another embodiment, the intermediate member 110 can facilitate coupling of the sensor member 108 to the fluid line 104. For example, the intermediate member 110 can be configured to receive the sensor member 108 via a bracket, screws, bolts, magnets, adhesive, or any other mechanism suitable to enable the intermediate member 110 to receive and/or support the sensor member 108. In one embodiment, the intermediate member 110 can include a magnetically-active material such that one or more magnets of the sensor member 108 can magnetically attach to the intermediate member 110. In another embodiment, the intermediate member 110 can include magnets that can couple to a magnetically-active material of the sensor member 108.

In one embodiment, the intermediate member of 110 can include a controller configured to receive one or more signals from the sensor member 108. For example, the intermediate member 110 can house one or more processors, one or more memory, or any other components suitable to enable the intermediate member 110 to receive and/or process signals generated by the sensor member 108. In another embodiment, the intermediate member 110 can be configured to relay one or more signals generated by the sensor member 108 to a controller. For example, a controller (e.g., controller 117) can be housed in a control panel 116 that can be coupled to the fluid dispensing crane 102. In one embodiment, the sensor member 108 can be configured to generate a signal and transmit the signal to the intermediate member 110 via cable 112. In another embodiment, the intermediate member 110 can be configured to receive a signal from the sensor member 108 and forward such signal to a controller in the control panel 116, such as via cable 118. In another embodiment, the sensor member 108, intermediate member 110, and/or control panel 116 and/or controller can be configured to communicate wirelessly. In another embodiment, the sensor member 108, intermediate member 110, and/or control panel 116 and/or controller can be configured to communicate via any suitable communications protocol, including Bluetooth, Ethernet, TCP/IP, UDP, or any other suitable protocol. In one embodiment, the intermediate member 110 can be configured to amplify a signal generated by the sensor member of 108, such that the signal can be received and/or read by a controller located within the control panel 116.

In another embodiment, a controller of the fluid dispensing system 100 can be configured to communicate and/or control components of the fluid dispensing crane 102. For example, the controller of the system 100 can be configured to operate a valve located within the crane. For example, fluid dispensing crane 102 can include a valve disposed between a fluid source and the first end 126 of the fluid line 104. In one embodiment, the controller of the system 100 can be configured to operate the valve in response to one or more signals generated via the sensor member 108. In another embodiment, a valve can be located in the nozzle 106, and a controller of the system 100 can be configured to operate the valve. In another embodiment, the controller of the system 100 can be configured to communicate with any electronics or other components of the fluid dispensing crane 102, such as to indicate to the fluid dispensing crane 102 that a valve should be opened and/or closed. For example, the controller can receive a signal from the sensor member 108 indicating that a fluid has not been detected at a particular level within receptacle 124, and the controller can facilitate the opening of a valve to allow materials to be dispensed into the receptacle 124. In another example, the controller can receive another signal from the sensor member of 108 indicating that fluid has been detected at a particular level within the receptacle 124, and the controller can facilitate the closing of the valve to terminate the dispensing of materials into the receptacle 124. In one exemplary embodiment, the controller of the system 100 can be configured to shut off fluid flow via the fluid line 104 such that a receptacle is not overfilled. For example, the sensor member 108 can be coupled to a sight glass 122 of a receptacle 124 and detect when a fluid level reaches a particular point, and thereby generate a signal that the controller of the system 100 can utilize to instantiate termination of the depositing of a material into the receptacle.

In one exemplary embodiment, the fluid dispensing system 100 can be configured and/or utilized to fuel a locomotive 120. For example, the locomotive 120 can include a receptacle (e.g., fuel tank) 124 that can include a sight glass 122. Before beginning to dispense fuel to the fuel tank 124, the sensor member 108 can be coupled to the sight glass 122, such that the sensor member 108 can determine a fluid level within the receptacle 124. In one embodiment, if the sensor member 108 does not detect fluid via the sight glass 122, the sensor member 108 can generate a signal indicating to a controller of the system 100 that fluid can be dispensed. In one embodiment, the intermediate member 110 can further include an indicator 128 that can indicate whether the system 100 is ready to dispense fluid. In one embodiment, the indicator 128 can be a light, a speaker, or any other component suitable to indicate the status of the system 100 and/or receptacle 124. In another embodiment, as the fuel tank 124 fills up, the sensor member 108 can continue to monitor the fluid level in the tank 124 via the sight glass 122. In another embodiment, if the sensor member 108 detects fluid within the tank 124, the sensor member 108 can generate a signal that can inform the controller of the system 100 that fluid dispensing should be terminated.

In one embodiment, the sensor member 108 can communicate with the intermediate member 110 via a 635 nm wavelength (or other suitable wavelength) visible red fiber optic signal (or other suitable signal). In another embodiment, the intermediate member 110 can generate a signal in response to an indication from the sensor member 108, such as via Banner DF-G3 Long Range Expert™ dual display fiber amplifier or other suitable amplifier. In another embodiment, the intermediate member 110 can communicate with the controller and/or control panel 116 via a 24-volt DC output (or any other suitable output) which can be triggered by the threshold setting of the amplifier of the intermediate member 110. In another embodiment, the output of the amplifier of the intermediate member 110 can be used to drive a relay contact (e.g., a 24 VDC relay contact) which can initiate a stop fueling signal or other suitable signal via the controller and/or control panel 116. In another embodiment, a sensing threshold of the sensor member 108 can be set at 2000 nm (or any other suitable limit). For example, readings from the sensor member 108 in the range of 0 to 2000 nm (or in any other range) can cause an output (e.g., from the intermediate member 110) to be off and indicate that fuel is sensed, instantiating termination of fluid dispensing. In another example, readings by the sensor member 108 in the range of 2001 to 9999 nm (or in any other range) can cause an output to be on and indicate that no fuel is sensed, meaning that fluid can continue to be dispensed. In another embodiment, full range signal level on an amplifier in an intermediate member 110 can be 0 to 9999 nm, or any other suitable range. In another embodiment, a gap distance can be maintained between a sensor of the sensor member 108 and, e.g., a sight glass 122 of the receptacle 124. For example, a gap distance can be dependent on sight glass style. In another example, the distance from, e.g., a sensor lens to sight glass can vary from 6 mm to 12 mm, or other suitable distance.

FIGS. 2A-2L illustrate perspective and schematic views of a sensor member 108 in accordance with one or more embodiments of the present disclosure. The sensor member 108 can include a support member 202 having a front side 204 and a back side 206. The support member 202 can be a frame, a housing, a casing, a bracket, or any other design suitable to lend structure to the sensor member 108 and/or facilitate the coupling of the sensor member 108 to a receptacle. In another embodiment, the support member 202 can include a handle (handle member) 210. The handle 210 can be rectangular, circular, triangular, rounded, angular, or any other configuration suitable to allow the support member 202 to be gripped. In another embodiment, the support number 202 can include a base portion 212. In one embodiment, the base portion 212 can include an opening 216. In one embodiment, the opening 216 can be configured to allow a view of a sight glass from the front side 204 of the support member of 202. In another embodiment, the opening 216 can be of any size and/or shape suitable to allow a sensor 208 to be disposed proximate a receptacle to facilitate the sensing of a fluid level within a receptacle.

In another embodiment, the support member 202 can include a brace 214. In one embodiment, the brace (brace member) 214 can be configured to about a receptacle. In another example, the brace 214 can be hingedly connected to the support member 202. For example, the support member 202 can include holes 222 configured to align with eyes 234 of the brace, such that a bolt and/or hinge and/or rod or any other component can be inserted therethrough to accomplish the hinged coupling of the brace 214 to support member 202. In another embodiment, the handle member 210 can be configured to couple to the brace 214. For example, holes 222 can be included on the handle number 210 such that the brace 214 can be coupled thereto. In another embodiment, the brace member 214 can be coupled with one or both of the handle member 210 and/or the base member 212. In another embodiment, the brace member 114 can be any configuration suitable to enable the brace member 214 to facilitate coupling of the support number 202 to a receptacle. In one embodiment, the brace member 214 can be configured to mobilize towards the receptacle when the support member 202 is placed on the receptacle and subsequently coupled to the receptacle, such as via magnets, adhesive, or any other mechanism suitable to allow the brace 214 to couple to the receptacle.

In another embodiment, the handle member 210 can be configured to couple to the base member 212. For example, the handle member 210 can be configured to attach to the base number 212 via screws, bolts, adhesive, welding, or any other mechanism suitable to attach the handle member of 210 to the base 212. In another embodiment, the handle number 210, base member 212, and/or brace member 214 can be configured to couple with one another via any suitable mechanism, including adhesive, welding, magnets, screws, pins, or any other suitable mechanism.

In another embodiment, the support member 202 can be configured to house electronics. For example, the handle member 210 can be configured to house electronics. For example, the handle 210 can be hollow such that one or more wires can be housed by the handle member 210. In another embodiment, base member 212 and/or brace 214 can be configured to house electronics. In another embodiment, the support member 202 can include any other design and/or mechanism suitable to enable the support number 202 to house and/or couple to electronics. For example, the support number 202 can be coupled with a sensor 208. For example, the sensor of 208 can utilize optics to detect a fluid level within a receptacle, such as by sensing the fluid level through a sight glass. In one embodiment, the support member 202 can be configured to facilitate the sensing of a fluid level by the sensor 208. For example, the opening 216 of the base member 212 can be configured to allow the sensor 208 to view the sight glass through the base member 212. For example, the sensor 208 can be oriented such that a front portion 238 of the sensor 208 can face towards the back side 206 of the support number 202. In one example, the sensor 208 can be coupled with the handle member 210, and the front portion 238 of the sensor 208 can be oriented to face towards the back side 206 of the support member through the opening 216, such that the front portion 238 of the sensor 208 can be proximate the sight glass. For example, the front portion 238 of the sensor 208 can include one or more lenses, mirrors, reflectors, lasers, infrared detectors, or any other components suitable to allow the sensor 208 to sense a fluid level via the front portion 238. In another embodiment, the sensor 208 can be configured to couple with the handle member 210 and receive wires or other circuitry (e.g., wire 236) that can be housed within the hollow handle 220 of the handle member 210.

In another embodiment, the handle number 210 can include a protrusion 218. for example, the handle member can include a protrusion 218 that can protrude away from the handle 220. In one embodiment, the protrusion 218 can be configured to receive electronics. For example, wire 236 can thread through the protrusion 218 and into the hollow handle 220, such as to supply power, data communication, or any other functionality to the sensor 208. In another embodiment, the protrusion 218 can be configured to couple with the base member 212. For example, the protrusion 218 can be configured to abut the base number 212 and couple thereto, such as via adhesive, welding, screws, or any other coupling mechanism suitable to couple the protrusion 218 to the base member 212.

In another embodiment, the base member 212 can be configured to facilitate the coupling of the support member 202 to a receptacle. For example, the base member 212 can include magnets 228 that can facilitate the coupling of the support member 202 to a receptacle. In another example, the support number 212 can include apertures 224 configured to receive magnets. In another embodiment, the base member can include an adhesive that can allow the base member and/or support member 202 to couple to a receptacle. In another embodiment, the base member 212 can include one or more spacers 226. For example, spacers 226 can facilitate the maintaining of a sensing distance and/or gap distance between the sensor 208 and the receptacle. For example, the sensor 208 can require a certain distance between the sight glass and the front portion 238 such that the sensor 208 can accurately detect a fluid level within the receptacle. In one embodiment, the base member 212 and/or spacers 226 thereon can ensure such a distance between the sensor 208 and the sight glass.

In another embodiment, the brace 214 can be configured to couple with the support member 202 and enhance coupling stability of the support member 202 with the receptacle. For example, the brace 214 can include one or more eyes 234 they can be configured to facilitate a hinge coupling between the support member 202 and the brace. Another embodiment, the brace can include any other design or mechanism suitable to enable the brace 214 to couple with support member 202 and facilitate the stabilization of the support number 202 by the brace 214. In another embodiment, the brace can include a crossbar 232 they can attach to legs 230 of the brace 214. for example, legs 230 can be configured to facilitate the coupling of the brace 214 to the receptacle. In one example, legs 230 can be configured to receive and/or include magnets that can couple the brace 214 to the receptacle. In another embodiment, legs 230 can include adhesive, bolts, grips, pads, feet, or any other component suitable to facilitate coupling of the brace to the receptacle and/or stabilization of the support member of 202 against the receptacle by the brace 214.

Figure 3:
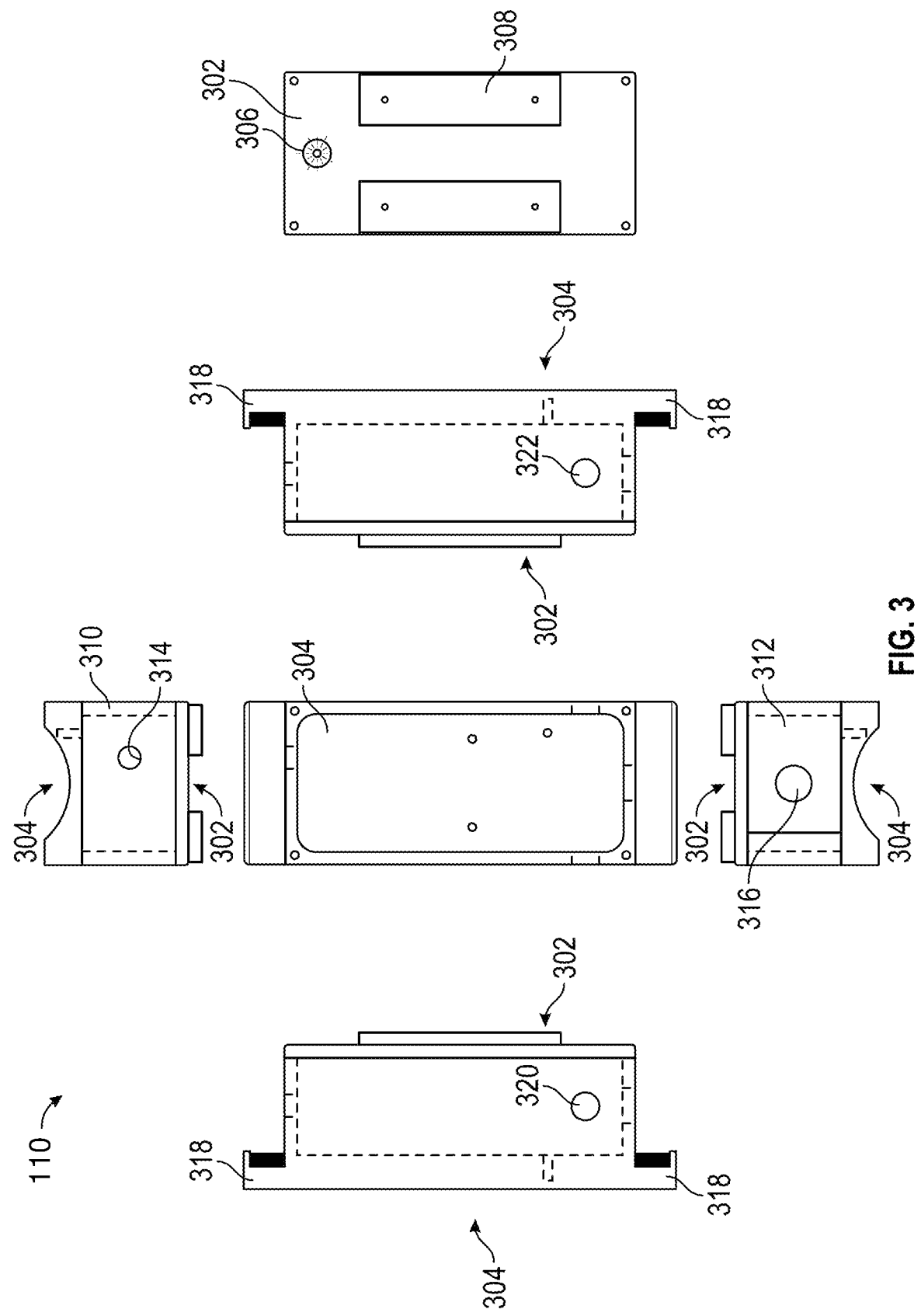
FIG. 3 illustrates a perspective view of an intermediate member in accordance with one or more exemplary embodiments of the present disclosure.

FIG. 3 illustrates a perspective view of an intermediate member 110 in accordance with one or more embodiments of the present disclosure. Intermediate number 110 can include a front side 302, a back side 304, a top 310, and a bottom 312. In one embodiment, the front side 302 can be configured to receive and/or couple a sensor member. For example, the front side 302 can include magnetically-active material 308 that can be configured to interact with magnets of the sensor member. For example, metal plates 308 can be affixed to the front side 302. In another embodiment, the front side 302 can include an indicator 306. For example, the indicator 306 can be a light configured to illuminate and indicate information about a system with which the intermediate number 110 is connected. For example, the indicator 306 can illuminate when a system is prepared to dispense a material. In another embodiment, the indicator 306 can switch off if the system is not ready to dispense material. In another embodiment, the indicator can be configured to convey any sort of indication suitable to communicate information regarding the system that the intermediate member 110 is a part of, and/or information about the intermediate member of 110. The indicator 306 can be a light, a speaker, a vibration device, or any other component suitable to communicate information. For example, the indicator 306 can flash in particular circumstances, change colors, make noise, or otherwise communicate in any suitable manner.

In another embodiment, the intermediate member 110 can include a back side 304. For example, the back side 304 can be configured to couple with a fluid line. For example, the backside 304 can be concave such that the backside 304 can receive a fluid line. In another embodiment, the backside can include adhesive, corrugation, embossing, clamps, grips, brackets, or any other components suitable to enable the intermediate member 110 to couple to a fluid line. In another embodiment, the intermediate member can include one or more brackets 318 that can facilitate coupling of the intermediate member 110 to a fluid line. For example, tethers can be used to tie the brackets 318 to a fluid line. In another example, the brackets can be any shape, design, or other component that can facilitate coupling of the intermediate member 110 to a fluid line.

In another embodiment, the intermediate member 110 can be configured to connect with a system, such as a fluid dispensing system, and/or components thereof. For example, the intermediate member 110 can include one or more apertures 314, 316, 320, 322 that can be configured to receive, e.g., electronics and/or wires. For example, apertures 314, 316, 320, 322 can be configured to allow access to the inside of the intermediate member, such as where electronic components can be housed. In another embodiment, the top 310 of the intermediate member 110 can be configured to facilitate communication of the intermediate member 110 with, for example, a control panel. For example, the top 310 can include an aperture 314 through which electronics can communicate with internal components of the intermediate member 110. In another embodiment, the bottom 312 of the intermediate number 110 can be configured to facilitate communication of the intermediate member 110 with, for example, a sensor. For example, the bottom 312 can include an aperture 316 through which electronics can communicate with internal components of the intermediate member 110. In another example, the top 310 and/or bottom 312 can include any other design suitable to allow access to internal components of their intermediate member 110 such that the intermediate member can participate in signaling within a fluid dispensing system. For example, the top and/or bottom 310, 312 can include antennas, cables, clamps, wires, or any other components and/or designs suitable to allow the intermediate member 110 to, for example, relay a signal from a sensor to a control panel or other controller. In another embodiment, a controller can be housed within the intermediate member of 110, such that aperture 314 and/or 316 and/or 320 and/or 322 can be used to access the controller.

Figure 4:
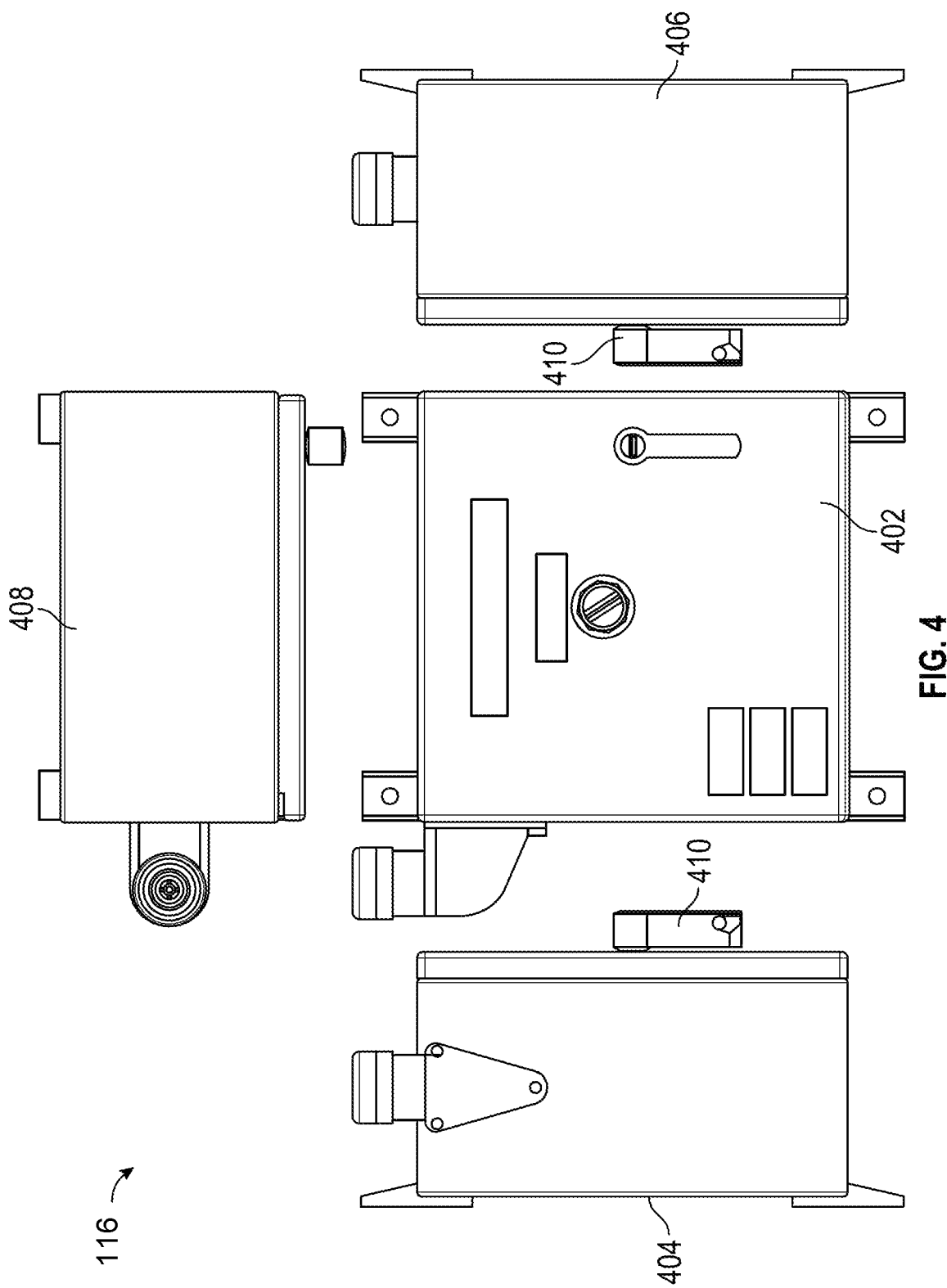
FIG. 4 illustrates an exemplary control panel in accordance with one or more exemplary embodiments of the present disclosure.

FIG. 4 illustrates an exemplary control panel 116 in accordance with the principles of the present disclosure. In one embodiment, the control panel 116 can be a control panel like those known in the art. In another embodiment, the control panel 116 can be any housing, casing, box, container, or any other components suitable to house a controller and/or processor and/or memory and/or any other circuitry suitable to receive signals from a sensor and utilize such signals to control operations of a material dispensing system. In another embodiment, the control panel 116 can include a front 402, two sides 404, 406, a top 408 and a bottom. In another embodiment, the control panel 116 can include an access point 410 through which wires, circuitry, and/or other components can access the inside of the control panel 116 without opening the control panel from the front 402. In another embodiment, the control panel 116 can be configured to couple with a fueling crane, such as a fueling crane known in the art. For example, a back of the control panel 116 can be configured to abut a fueling crane and couple thereto.

Figure 5:
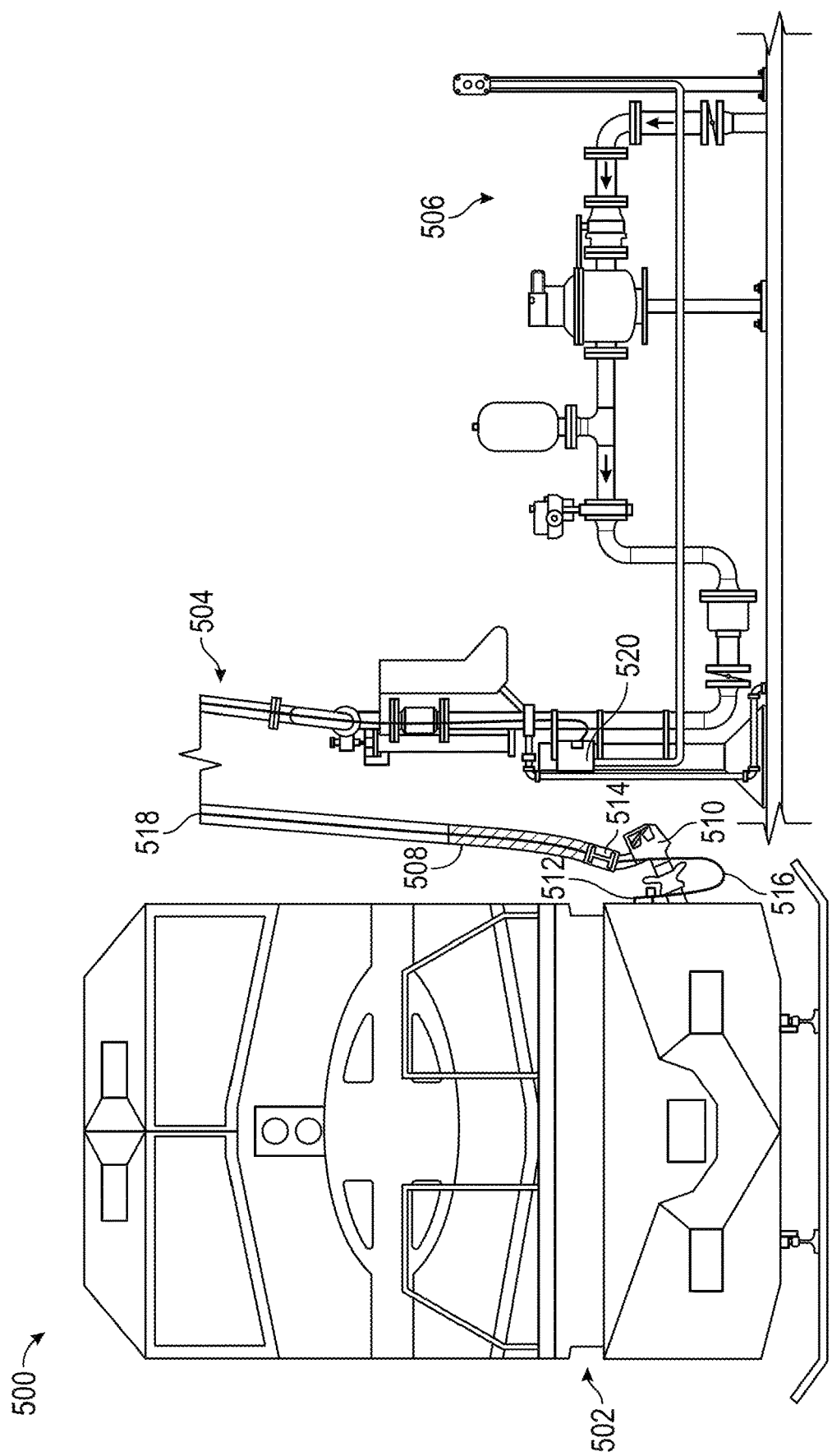
FIG. 5 illustrates a perspective view of method of fueling a vehicle in accordance with one or more exemplary embodiments of the present disclosure.

FIG. 5 illustrates a perspective view of method of fueling a vehicle 500 in accordance with one or more embodiments of the present disclosure. In one embodiment, a locomotive 502 can be stationary and prepared for fueling. In another embodiment, a fueling crane 504, such as a fueling crane known in the art, can be disposed proximate the locomotive 500. In another embodiment, the fueling crane 504 can be in operable communication with a fluid source (fuel source) 506. For example, the fueling crane 504 can be configured to transport fuel from the fluid source 506 to the locomotive 502. In another embodiment, the fuel in crane 504 can include a fuel line 508 that can be configured to dispense fuel from the fuel source 506. In another embodiment, a nozzle 510 can be coupled to the fuel line 508. In another embodiment, a sensor member 512 can be coupled to a sight glass of a fuel tank of the locomotive 502. In one embodiment, the sensor member 512 can be a sensor or sensor member in accordance with the principles of the present disclosure. In another embodiment, the sensor member 512 can be in operable communication with an intermediate member 514, such as via a cable 516. In another embodiment, the sensor member of 512 can be in operable communication with the intermediate member 514 via any suitable communication means, wired or wireless or both.

In one embodiment, the intermediate member 514 can be coupled with the fuel line 508. For example, the intermediate member 514 can be tethered to the fuel line, adhere to the fuel line, or be coupled to the fuel line via any suitable mechanism. In another embodiment, the intermediate member of 514 can be configured to receive the sensor member 512. In another embodiment, a control panel 520 can house a controller configured to operate a valve of the fueling crane 504. For example, the control panel 520 can include a controller configured to receive one or more signals from the sensor (for example, as forwarded by the intermediate member of 514) and cause one or more valves of the fueling crane 504 to close upon reception of such signals. In another embodiment, the controller within the control panel 520 can be configured to communicate with electronics of the fueling crane such that the controller can indicate to the electronics the fueling crane that fuel should be dispensed or that fuel dispensing should be terminated. In another embodiment, cable 518 can facilitate communication between the sensor member 500 and the control panel 520. For example, the sensor member of 512 can communicate with the intermediate member 514 via cable 516, and the intermediate member 514 can relay information from the sensor member 500 to the control panel 520 via cable 518. In another embodiment, the intermediate member 514 can serve as an amplifier, and be configured to amplify a signal generated by the sensor member 512 to the control panel 520.

The present disclosure achieves at least the following advantages:

1. Preventing overfilling of receptacles via automated sight glass monitoring;
2. Providing a sight glass monitor apparatus that can generate a signal and/or alert if a particular material level in a receptacle is detected;
3. Enhancing fuel dispensing by minimizing waste due to overfilling; and
4. Enhancing automatic shutoff technology by implementing a sight glass reader in operable communication with a controller that can be configured to communicate with fueling system infrastructure to shut off fuel flow.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A sight glass monitor apparatus, the apparatus comprising:
    a support member including a front side and a back side, the support member configured to couple to a receptacle having a sight glass, wherein the support member includes a base portion having an opening extending from the front side to the back side of the support member and allowing a view of the sight glass through the front side and the back side of the support member;
    a sensor having a front portion and coupled to the support member; and
    a controller in operable communication with the sensor and configured to receive one or more signals from the sensor,
    wherein the sensor is configured to detect a level of a material in the receptacle via the sight glass.

2. The apparatus of claim 1, wherein the support member includes a handle internally hollow and configured to house at least a portion of one or more electronic components associated with the sensor.

3. The apparatus of claim 1, wherein the front portion of the sensor is positioned to face toward the back side of the support member through the opening.

4. The apparatus of claim 1, wherein the support member is configured to magnetically couple to the receptacle.

5. The apparatus of claim 1, wherein the support member further includes a hinged brace configured to abut the receptacle.

6. The apparatus of claim 1, wherein the opening is configured to allow a view of a sight glass from the front side of the support member.

7. The apparatus of claim 1, further comprising an intermediate member in operable communication with the sensor and the controller.

8. The apparatus of claim 7, wherein the intermediate member is coupled to a fuel line.

9. The apparatus of claim 7, wherein the intermediate member is configured to relay the one or more signals generated by the sensor member to the controller.

10. A method of using a sight glass monitor apparatus, comprising:
    coupling a support member including a front side and a back side, the support member to a receptacle having a sight glass, wherein the support member includes a base portion having an opening extending from the front side to the back side of the support member and allowing a view of the sight glass through the front side and the back side of the support member;
    coupling a sensor having a front portion to the support member, wherein the sensor is configured to detect a material on the interior of the receptacle via the sight glass; and
    receiving, via a controller in operable communication with the sensor, one or more signals from the sensor; and
    detecting a level of a material in the receptacle.

11. The method of claim 10, wherein the support member includes a handle internally hollow and configured to house at least a portion of one or more electronic components associated with the sensor.

12. The method of claim 10, wherein the front portion of the sensor is positioned to face toward the back side of the support member through the opening.

13. The method of claim 10, wherein the support member is configured to magnetically couple to the receptacle.

14. The method of claim 10, wherein the support member further includes a hinged brace configured to abut the receptacle.

15. The method of claim 10, further comprising an intermediate member in operable communication with the sensor and the controller.

16. The method of claim 15, wherein the intermediate member is coupled to a fuel line.

17. The method of claim 15, wherein the intermediate member is configured to relay the one or more signals generated by the sensor member to the controller.

* * * * *